United States Patent [19]

Sable

[11] 4,076,302
[45] Feb. 28, 1978

[54] OPERATOR'S SEAT ASSEMBLY

[75] Inventor: Frank Robert Sable, Wickliffe, Ohio

[73] Assignee: Towmotor Corporation, Mentor, Ohio

[21] Appl. No.: 706,347

[22] Filed: Jul. 19, 1976

[51] Int. Cl.² ............................................. B60N 1/02
[52] U.S. Cl. .............................. 296/65 R; 180/89.14; 296/102; 297/331
[58] Field of Search ...................... 296/65 R, 63, 28 C, 296/102; 180/89.13, 89.14, 89.15, 89.16; 297/331, 334

[56] References Cited

U.S. PATENT DOCUMENTS

| | | | |
|---|---|---|---|
| 3,261,422 | 7/1966 | Jensen | 296/65 R |
| 3,317,175 | 5/1967 | Ford | 296/65 R |
| 3,369,629 | 2/1968 | Weiss | 296/65 R |
| 3,463,542 | 8/1969 | Daniels | 297/331 |
| 3,787,086 | 1/1974 | Cosby | 296/65 R |
| 3,827,747 | 8/1974 | Cookes | 296/65 R |
| 3,873,153 | 3/1975 | Mackintosh | 297/334 |

FOREIGN PATENT DOCUMENTS 1,131,530   6/1962   Germany ........................... 296/65 R
1,245,747   9/1971   United Kingdom .............. 180/89.14

Primary Examiner—Joseph F. Peters, Jr.
Assistant Examiner—John A. Carroll
Attorney, Agent, or Firm—Wegner, Stellman, McCord, Wiles & Wood

[57] ABSTRACT

An operator's seat assembly for use on industrial vehicles, such as forklifts, for example, including a seat and a support for the seat on the frame of the vehicle. The seat is pivotally mounted to the support which, in turn, is pivotally mounted to the vehicle frame. This mounting arrangement allows the support to be tilted forwardly of the vehicle's operator's station; the seat pivot allows the seat to be tilted forwardly to a greater degree than would be possible with the support pivoted alone. Biasing members, preferably in the form of spring assemblies, are provided at each pivot location thereby providing forces to urge the seat assembly to its forward position when the operator is not seated in the operator's compartment. This device is especially useful in electric forklifts wherein a removable battery is located beneath the operator's station, as the forward biasing mechanism provides sufficient clearance to permit removal of the battery by lifting.

9 Claims, 3 Drawing Figures

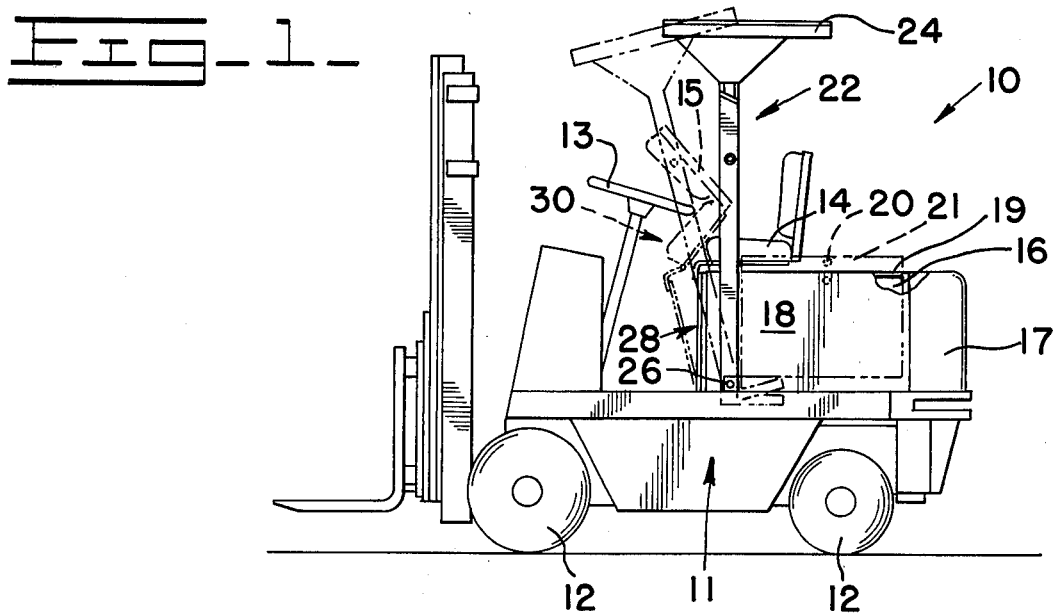
Fig-1-
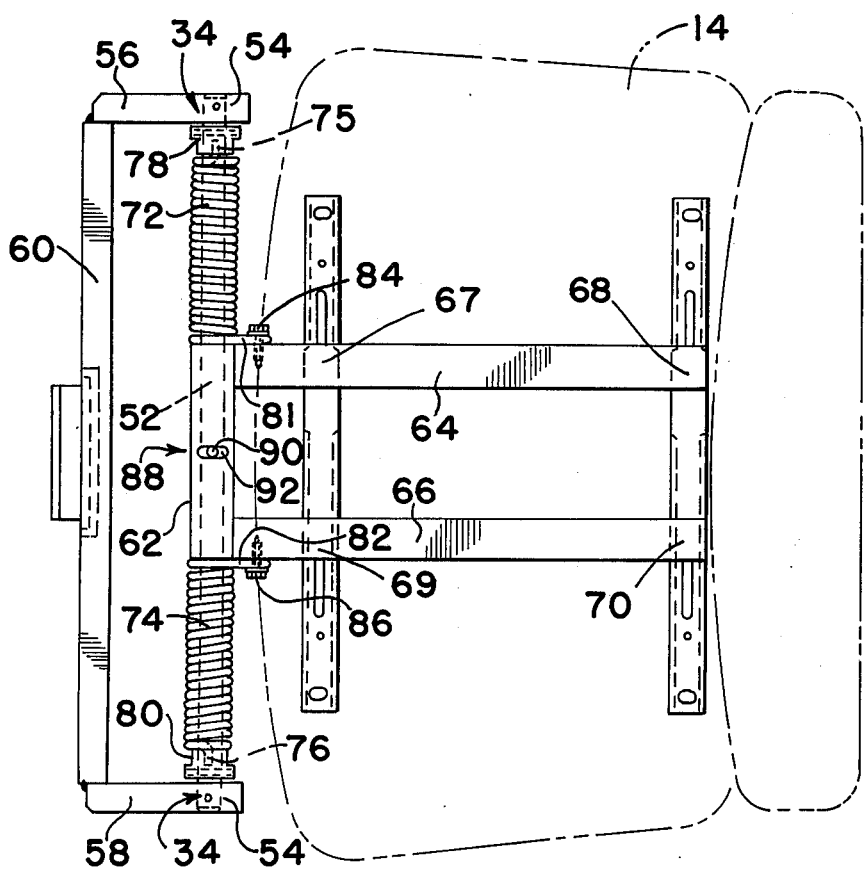
Fig-3-

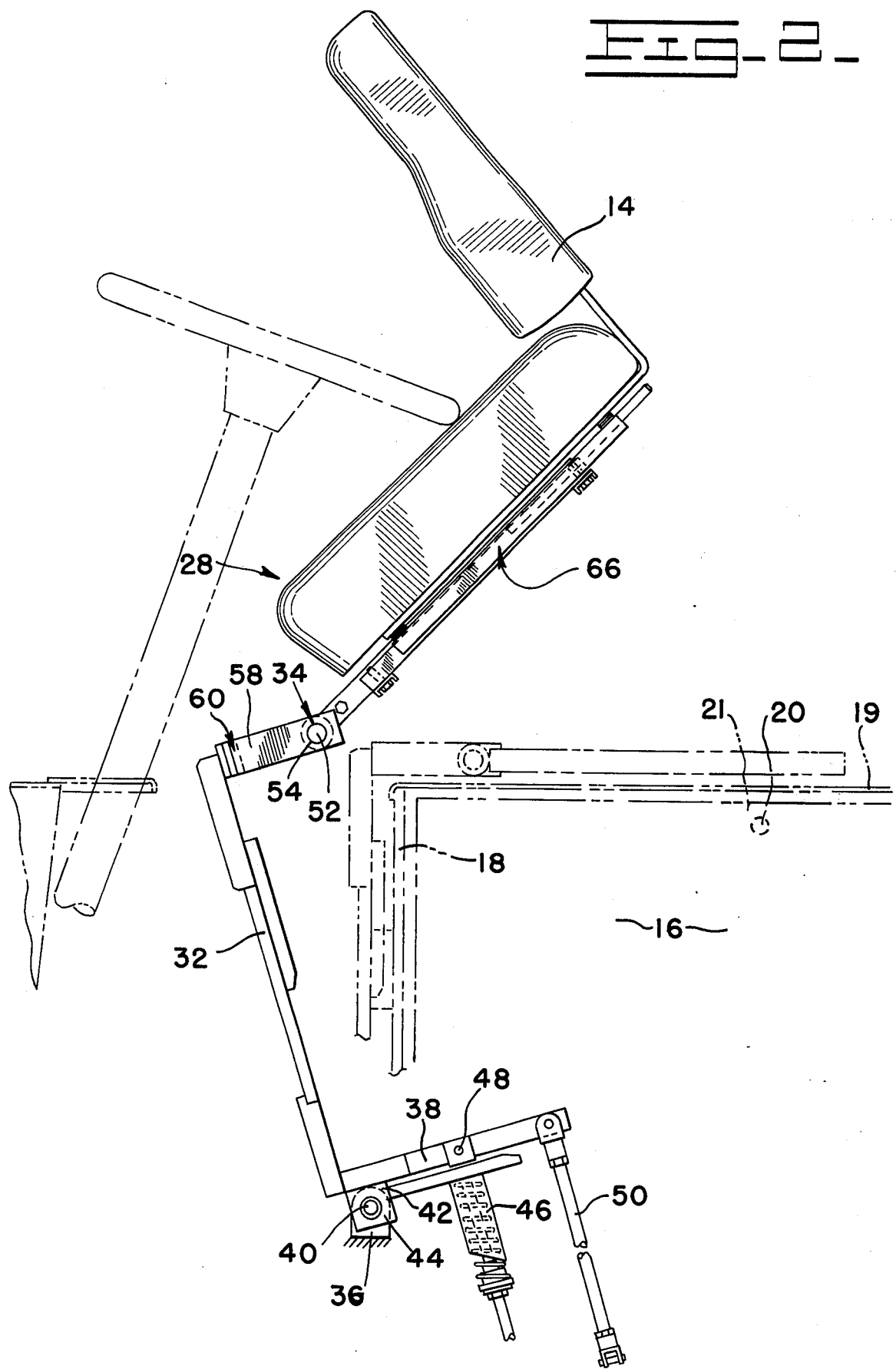

OPERATOR'S SEAT ASSEMBLY

BACKGROUND OF THE INVENTION

1. Field of the Invention

This invention relates to forklift-type vehicles and, more particularly, to biased operator seat assemblies for use on said vehicles.

2. Description of the Prior Art

This invention relates to operator seat assemblies adapted for use on forklift-type vehicles and utilizing means for pivoting the seat assembly forwardly of the operator's station in order to allow access to the vehicle's power source, such as a battery, for example. Such a pivoting feature is useful, as the operator's seat on many forklifts is situated upon a compartment containing the vehicle's battery. Removal of the battery for maintenance, etc., can often be effected only by lifting of the battery, necessitating the temporary removal of the seat from the space above the battery.

Two examples of previous pivotable seat designs are provided by U.S. Pat. Nos. 3,787,086 and 3,827,747 issued to Cosby and Cookes, respectively. The seats disclosed in these patents are designed to be swung outwardly of one side of the truck from a forwardly facing operative position to a nonoperative position facing rearwardly of the compartment housing the vehicle's power source.

Another seat pivot design comprises the well-known "dead-man's" feature by which the operator's seat will be urged forwardly of its operative position whenever the operator is not seated thereon. This device is often coupled with the vehicle's motive means in order to disengage the motive means in the event the operator dismounts the seat. The "dead-man's" design alone does not permit adequate clearance for ready removal of the battery.

SUMMARY OF THE INVENTION

It is an object of the invention to provide a new and improved operator's seat assembly for use in industrial vehicles, such as forklift trucks and the like. More specifically, it is an object of the invention to provide an operator's seat assembly including dual biasing means, one of said means engaging the seat and the support therefor, and the other engaging the support and the vehicle frame, the purpose of the first means being to urge the seat forwardly of its operative position relative to the support and the purpose of the second means being to urge the support forwardly of its operative position relative to the frame. The dual biasing arrangement provides an easier method for effecting clearance of the space above the vehicle's battery compartment than was available previously while still maintaining the "dead-man's" design advantage.

BRIEF DESCRIPTION OF THE DRAWINGS

The details of construction and operation of the invention are more fully described with reference to the accompanying drawings which form a part hereof and in which like reference numerals refer to like parts throughout. In the drawings:

FIG. 1 is an elevational view of a forklift vehicle incorporating my improved operator's seat assembly;

FIG. 2 is an enlarged elevational view of the operator's seat assembly shown in its full tilt position; and FIG. 3 is an enlarged overhead plan view of the operative parts of the operator's seat assembly of FIG. 2.

DESCRIPTION OF THE PREFERRED EMBODIMENT

Referring to FIG. 1, an exemplary embodiment of the invention includes a forklift or similar vehicle, generally designated 10, provided with motive means (not shown). The vehicle 10 shown in FIG. 1 is of a well-known type and comprises generally a frame 11 resting upon wheels 12 and is equipped with steering apparatus 13 controlled by an operator (not shown) situated on an operator's seat 14. The seat 14 is shown in its operative position by solid lines and in a full tilt or nonoperative position 15 by dotted lines.

A removable element 16 is situated generally beneath and rearwardly of the operator's seat 14 and forwardly of the counterweight 17 located on the rearmost portion of the vehicle 10. In a preferred embodiment, the removable element 16 comprises a battery provided as a power source for said motive means and will be referred to as such in the following, such reference being understood to be by way of example only, and not by way of limitation.

It may be noted that battery 16 rests inside a compartment 18, the rear wall thereof being connected to the counterweight 17 and the side walls thereof being formed by or carried by the vehicle frame 11. Therefore, it is possible to remove the battery 16 only by lifting it from its operative position in the compartment 18 after the lid 19 has been removed from said compartment 18.

In practice, it is necessary to remove the battery 16 from its compartment 18 for purposes of maintenances, etc. Since battery 16 may be removed only by lifting, it is necessary to provide sufficient clearance above battery 16 to allow it to be raised above the top of compartment 18. The lifting may be accomplished by means of a chain hoist (not shown) attached to the battery 16 at lifting holes 20 formed in the battery case 21 of the battery 16.

The forklift of FIG. 1 is provided with an overhead guard assembly, generally designated 22. The horizontal guard surface 24 extends over compartment 18 when the guard assembly 22 is in its operative position (shown by solid lines in FIG. 1). When the battery 16 is lifted from the compartment 18, the overhead guard assembly 22 rotates about its pivot axis 26 so as to provide overhead clearance for the removal of said battery. The particular guard assembly illustrated in FIG. 1 is the subject of U.S. Pat. No. 4,047,750 issued Sept. 13, 1977, and owned by the assignee of the present application, and is described in detail therein. It may be noted that the use of guard assembly 22 is complementary to the use of the operator's seat assembly described herein and that either device may be incorporated into forklift vehicles independently of the other.

As shown in FIG. 1, the operator's seat 14 is situated generally above the compartment 18 and therefore must be moved before the battery 16 may be lifted from the compartment 18. Seat 14 is an integral part of the operator's seat assembly, generally designated 28 and shown in its operative position by solid lines. The seat assembly is shown in its full tilt or non-operative position 30 by dotted lines.

Referring to FIG. 2, seat assembly 28 is shown in its full tilt or nonoperative position with portions of the assembly shown in phantom line. The seat assembly 28 comprises operator's seat 14 pivotally secured to the support member 32. The support member 32 is, in turn, pivotally secured to the vehicle frame 36. The pivotal mounting of the support 32 to the frame 36 makes use of the conventional "dead-man's" safety switch arrangement.

In the form of "dead-man's" arrangement shown, support member 32 has an integrally attached base 38 extending perpendicularly rearwardly of the support member 32. The base member 38 is pivotally secured to the vehicle frame 36 by pins 40 passing through flanges 42 projecting from base 38 and through ears 44 mounted on said frame 36. Spring actuator member 46 is secured by pin 48 to base 38 so as to urge said base 38 upwardly relative to frame 36, thereby tilting or urging support means 32 in a counterclockwise direction to a position wherein said support members 32 extend upwardly and forwardly from said frame 36. The connector 50, connected to the remote end of base 38, is connected to the vehicle drive system in such a way as either to engage the brake and/or to disconnect the drive to the wheels upon the operator leaving the seat 14.

The forward tilt afforded the seat 14 by the "dead-man's" arrangement is not sufficient to permit ready removal of the battery 16 from the compartment 18 since the rear portion of the seat still overhangs or overlaps a substantial portion of said battery 16. To provide the added clearance needed for the ready removal of the battery 16, the additional tilt capability is added to the seat mounting.

As shown in FIG. 3, a shaft 52 (shown by dotted lines) extends between and is keyed into openings 54 formed in fingers 56 and 58 which extend perpendicularly rearward from the crossbar 60 of support member 32. Annular sleeve 62 is substantially concentrically mounted about the shaft 52 and is positioned substantially centrally thereof. Seat support bars 64 and 66 are rigidly mounted on sleeve 62 and extend rearwardly therefrom. The seat 14 is mounted to said bars 64 and 66 at points 67, 68, 69 and 70 so as to be laterally adjustable relative to said bars 64, 66. Helical spring means 72 and 74 extend along shaft 52 outwardly from sleeve 62 and are secured at their outer ends 75, 76 to anchors 78 and 80 fixed on shaft 52 near the inner surface of fingers 56 and 58. The inner ends 81, 82 of spring means 72 and 74 are secured to seat support bars 64 and 66 by fasteners 84 and 86.

The springs 72 and 74 are loaded or wound to exert an upward force on support bars 64 and 66, and therefore upon seat 14. Unless restrained, seat 14 tends to be rotated counterclockwise or forwardly about the axis of the shaft 52. A stop or retaining means 88 is provided centrally of shaft 52; said retaining means 88 comprising a pin 90 extending radially outwardly from shaft 52. The pin 90 extends through an elongate slot or opening 92 in sleeve 62 to permit rotation of the seat about the axis of the shaft in a forward or rearward direction. Engagement of the pin with one end or the other of the slot 92 will limit or stop further rotation or tilting of the seat 14. The seat 14 is suspended above the battery even under the weight of the operator by the engagement of the pin against one end of said slot. With the seat 14 unoccupied, the springs 72,74 tilt the seat forward until the pin engages the other end of the slot 92.

The combined tilting provided by the pivotal mounting of the support 32 to the frame 36 and by the pivotal mounting of the seat 14 to the support 32 raises and moves the seat forward an amount sufficient to permit the battery 16 to be lifted from the compartment 18 without material interference from said seat.

What is claimed is:

1. In an operator's seat assembly for use in industrial vehicles having a frame,
a seat,
upstanding support means connected to said frame and to said seat for supporting said seat on said frame,
first pivot means between said support means and said frame,
first biasing means engaging said support means and said frame for urging said support means about said first pivot means toward the front of said frame,
the improvement comprising:
second pivot means between said seat and said support means for pivotally securing said seat to said support means so as to allow rotation of said seat about said second pivot means, and
second biasing means engaging said seat and said support means for urging said seat toward the front of said frame whereby the combined first and second pivot means and first and second biasing means urges said seat toward the front of said frame sufficient to clear an opening normally partially covered by said seat when said seat is occupied by an operator.

2. The operator's seat assembly of claim 1 wherein the second pivot means comprises:
a shaft fixed in relation to said support means and extending transversely thereto,
a sleeve carried by said seat and being rotatably mounted on said shaft, and
means for limiting the degree of rotation of said seat about said second pivot means.

3. The operator's seat assembly of claim 2 wherein the second biasing means engaging said seat and said support means comprises a spring assembly.

4. The operator's seat assembly of claim 3 wherein the spring assembly comprises a helical spiral spring encircling said shaft and having one end urging said seat upward and toward the front of said vehicle.

5. The operator's seat assembly of claim 2 wherein the means for limiting rotation of the seat comprises pin means fixed to the shaft and extending radially outwardly therefrom, and said pin means extending through an elongate opening in the sleeve so as to contact the edge of said opening and thereby stop the rotation of the sleeve after the sleeve has accomplished a desired degree of rotation.

6. In an operator's seat assembly for use in industrial vehicles having a frame,
a seat, and
upstanding support means connected to said frame and to said seat for supporting said seat on said frame, the improvement comprising:
pivot means between said seat and said support means for pivotally securing said seat to said support means so as to allow rotation of said seat about said pivot means, and
biasing means engaging said seat and said support means for urging said seat toward the front of said frame an amount sufficient to clear an opening normally partially covered by said seat when said seat is occupied by an operator.

7. The operator's seat assembly of claim 6 wherein the pivot means comprises:

a shaft fixed in relation to said support means and extending transversely thereto;

a sleeve carried by said seat and rotatably mounted on said shaft; and means for limiting the degree of rotation of said seat about said shaft.

8. The operator's seat assembly of claim 6 wherein the biasing means engaging said seat and said support means is a helical spiral spring biasing said seat toward the front of the frame.

9. The operator's seat assembly of claim 7 wherein the means for limiting rotation of the seat comprises a cooperating pin and slot arrangement on the sleeve and shaft whereby contact of the pin with the end of the slot limits the rotation of the seat relative to the shaft.

* * * * *